United States Patent
Noe et al.

(10) Patent No.: US 11,551,203 B2
(45) Date of Patent: Jan. 10, 2023

(54) RETRIEVING HIDDEN DIGITAL IDENTIFIER

(71) Applicant: MASTERCARD INTERNATIONAL INCORPORATED, Purchase, NY (US)

(72) Inventors: James Noe, West Wickham (GB); John Tierney, Wirral (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 329 days.

(21) Appl. No.: 16/665,768

(22) Filed: Oct. 28, 2019

(65) Prior Publication Data

US 2020/0143083 A1     May 7, 2020

(30) Foreign Application Priority Data

Nov. 2, 2018  (EP) .................................... 18204089

(51) Int. Cl.
  *G06Q 20/36* (2012.01)
  *G06Q 20/38* (2012.01)
  (Continued)

(52) U.S. Cl.
  CPC ..... *G06Q 20/3674* (2013.01); *G06F 21/6254* (2013.01); *G06F 21/6272* (2013.01);
  (Continued)

(58) Field of Classification Search
  CPC .............. G06F 21/6254; G06Q 20/342; G06Q 20/3672; G06Q 20/3674; G06Q 20/385
  See application file for complete search history.

(56) References Cited

U.S. PATENT DOCUMENTS

| 9,332,433 | B1 | 5/2016 | Dotan et al. |
| 2002/0077992 | A1 | 6/2002 | Tobin |

(Continued)

OTHER PUBLICATIONS

U. Demir Alan and D. Birant, "Server-Based Intelligent Public Transportation System with NFC," in IEEE Intelligent Transportation Systems Magazine, vol. 10, No. 1, pp. 30-46, Spring 2018, doi: 10.1109/MITS.2017.2776102. (Year: 2018).*

(Continued)

*Primary Examiner* — Eric T Wong
(74) *Attorney, Agent, or Firm* — Harness, Dickey & Pierce, P.L.C.

(57) ABSTRACT

A method of providing access to securely held data is provided. A user interacts with the service provider to obtain access to a service by using a device to provide a digital identifier to the service provider, without the digital identifier being made known to the user. At a later date the user wishes to retrieve securely stored data relating to their use of the service. However, because the user does not know the digital identifier, they are unable to identify themselves to the service provider using the digital identifier. The present disclosure provides a secure method for exchanging private identifiers, which allows the user to identify themselves to the service provider in order to gain access to securely stored data relating to the user's previous use of the service. The user can do this using the device on which the digital identifier is stored, or another device.

15 Claims, 8 Drawing Sheets

(51) Int. Cl.
*G06Q 20/34* (2012.01)
*G06F 21/62* (2013.01)
*H04W 76/00* (2018.01)

(52) U.S. Cl.
CPC ....... *G06Q 20/342* (2013.01); *G06Q 20/3672* (2013.01); *G06Q 20/385* (2013.01); *H04W 76/00* (2013.01)

(56) References Cited

U.S. PATENT DOCUMENTS

| | | |
|---|---|---|
| 2005/0137981 A1 | 6/2005 | Maes |
| 2010/0199098 A1* | 8/2010 | King ..................... H04L 9/0866 713/182 |
| 2014/0164243 A1* | 6/2014 | Aabye ..................... G06Q 20/20 705/44 |
| 2014/0229276 A1 | 8/2014 | Fisher |
| 2014/0310179 A1* | 10/2014 | Silbernagl ................ G07C 9/27 235/382 |
| 2015/0032626 A1* | 1/2015 | Dill .................... G06Q 20/4016 705/44 |
| 2015/0120472 A1 | 4/2015 | Aabye et al. |
| 2017/0200165 A1 | 7/2017 | Laxminarayanan et al. |
| 2018/0068313 A1* | 3/2018 | Van Os ................. G06Q 20/36 |

OTHER PUBLICATIONS

L. Bai, G. Kane and P. Lyons, "Open architecture for contactless smartcard-based portable electronic payment systems," 2008 IEEE International Conference on Automation Science and Engineering, 2008, pp. 715-719, doi: 10.1109/COASE.2008.4626497. (Year: 2008).*

T. Gyger and O. Desjeux, "EasyRide: active transponders for a fare collection system," in IEEE Micro, vol. 21, No. 6, pp. 36-42, Nov.-Dec. 2001, doi: 10.1109/40.977756. (Year: 2001).*

* cited by examiner

RETRIEVING HIDDEN DIGITAL IDENTIFIER

CROSS-REFERENCE TO RELATED APPLICATION

This application claims the benefit of, and priority to, European Patent Application No. 18204089.9 filed on Nov. 2, 2018. The entire disclosure of the above application is incorporated herein by reference.

FIELD

The present disclosure relates to a method and a system for providing access to securely stored data.

BACKGROUND

This section provides background information related to the present disclosure which is not necessarily prior art.

In computer implemented communication and data exchange processes, it is common for users and devices to identify themselves to other users and devices using digital identifiers. A digital identifier can be used to identify a user or device that has permission to access secure systems or data that are not open to the public. Similarly, digital identifiers can be used to identify users or devices that have permission to edit data held in secure systems. A device attempting to edit a database may, for example, be required to present a digital identifier before its proposed changes to the database are permitted.

Due to the potentially sensitive permissions granted by digital identifiers, it is important that the digital identifiers can be stored and transmitted securely without being obtained by malicious third parties. In certain systems, a digital identifier can be stored within a device and presented to outside systems without the identifier being known by the user of the device. For example, such an identifier may be transmitted in a near field communication (NFC) message. Though the user of the device may use the digital identifier to access outside systems and data, the process does not involve providing the digital identifier to the user. Security risks associated with the provision of the digital identifier to the user, such as a malicious third party nearby reading the identifier from a device screen over the user's shoulder, are thereby avoided.

While the direct transmission of a digital identifier stored on a device to an outside system without involving provision of the digital identifier to the device's user provides increased security, this does mean that the user is unable to identify themselves to the outside system when the electronic device is not in communication with it.

There is a need, therefore, for a method of providing a user with access to securely stored data, in a system where access to the data is granted in response to receipt of a digital identifier securely stored on a device, without the digital identifier being made known to the device's user.

SUMMARY

This section provides a general summary of the disclosure, and is not a comprehensive disclosure of its full scope or all of its features. Aspects and embodiments of the disclosure are set out in the accompanying claims.

According to a first aspect, there is provided a computer implemented method of providing access to securely stored data, the method comprising a server of a service provider: receiving, from a user device, one or more requests for services, each such request indicating the same digital identifier; securely storing, in an interactions database, a record of each requested service together with the digital identifier; at a later time, receiving, from a communications device, a request for a list of services provided to the user by the service provider, said request indicating user details which are available to the user but which were not indicated in any of the one or more requests for services; generating a special personal identifier number, 'sPIN', the sPIN indicating the user details and comprising a flag indicating that the sPIN indicates the user details; sending a request for the digital identifier to the network processor, the request comprising the sPIN; receiving, from the network processor, a response to the request for the digital identifier, said response comprising the sPIN and the digital identifier; responsive thereto, obtaining, from the interactions database, the record of each requested service associated with the digital identifier; and providing, to the communications device, the record of each requested service associated with the digital identifier.

The communications device can be the user device.

The digital identifier can be stored on the user device.

The digital identifier can be a payment token.

The sPIN can be in a format corresponding to that of a primary account number (PAN).

The sPIN can consist of nineteen digits.

The user details can indicate one or both of an account number and a sort code of an account associated with the digital identifier.

The flag can be a single digit.

The first six digits of the sPIN can identify an issuer of the account, and indicate the first two digits of the sort code; one of the remaining digits of the sPIN can be the flag; eight of the remaining digits of the sPIN can indicate the account number; and four of the remaining digits of the sPIN can indicate the last four digits of the sort code.

The flag can be a flag code corresponding to a code stored by the network processor and/or an issuer of an account associated with the digital identifier.

The first six digits of the sPIN can be the flag code, and identify an issuer of the account; one of the remaining digits of the sPIN can indicates the first two digits of the sort code; eight of the remaining digits of the sPIN can indicate the account number; and four of the remaining digits of the sPIN can indicate the last four digits of the sort code.

The first six digits of the sPIN can be the flag code, and identify an issuer of the account; the final digit of the flag code can indicate a digit of the sort code; five of the remaining digits of the sPIN can indicate the remainder of the sort code; and eight of the remaining digits of the sPIN can indicate the account number.

The method can further comprise, prior to receiving the request for the list of services provided to the user by the service provider: receiving, from a further user device, one or more further requests for services, each such request indicating a further digital identifier different to the digital identifier referred to above; and securely storing, in the interactions database, a record of each further requested service together with the further digital identifier; wherein the response to the request for the digital identifier further comprises the further digital identifier. The method can further comprise: responsive to receiving the response, obtaining, from the interactions database, the record of each further requested service associated with the further digital identifier; and providing, to the communications device, the record of each further requested service associated with the further digital identifier.

According to a second aspect there is provided a computer system configured to perform the method of the first aspect.

According to a third aspect there is provided a computer readable medium comprising instructions which, when executed by a processor, cause the method of the first aspect to be performed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In connection therewith, aspects of the present disclosure will now be described by way of example with reference to the accompanying figures. In the figures.

Corresponding reference numerals indicate corresponding parts throughout the several views of the drawings.

DETAILED DESCRIPTION

Embodiments will be described, by way of example only, with reference to the drawings. The description and specific examples included herein are intended for purposes of illustration only and are not intended to limit the scope of the present disclosure. The following description is presented to enable any person skilled in the art to make and use the system, and is provided in the context of a particular application. Various modifications to the disclosed embodiments will be readily apparent to those skilled in the art.

In the following, references to entities, such as service providers (including transit providers), acquirers, network processors and issuers, should be understood to refer to servers operated by those entities. For example, a message described as being forwarded from an acquirer to an issuer via a network processor is sent from the acquirer's server, to the network processor's server then on to the issuer's server.

The present disclosure provides a method of providing access to data held securely by a service provider. A user interacts with the service provider to obtain access to a service by using a device to provide a digital identifier to the service provider, without the digital identifier being made known to the user. At a later date the user wishes to retrieve securely stored data relating to their use of the service. However, because the user does not know the digital identifier, they are unable to identify themselves to the service provider using the digital identifier. The present disclosure provides a secure method for exchanging private identifiers, which allows the user to identify themselves to the service provider in order to gain access to securely stored data relating to the user's previous use of the service. The user can do this using the device on which the digital identifier is stored, or another device.

The method is illustrated below in the context of a transit system. It will be understood, however, that the principles discussed herein are applicable to a range of systems that require secure exchanges of data.

Figure 1:
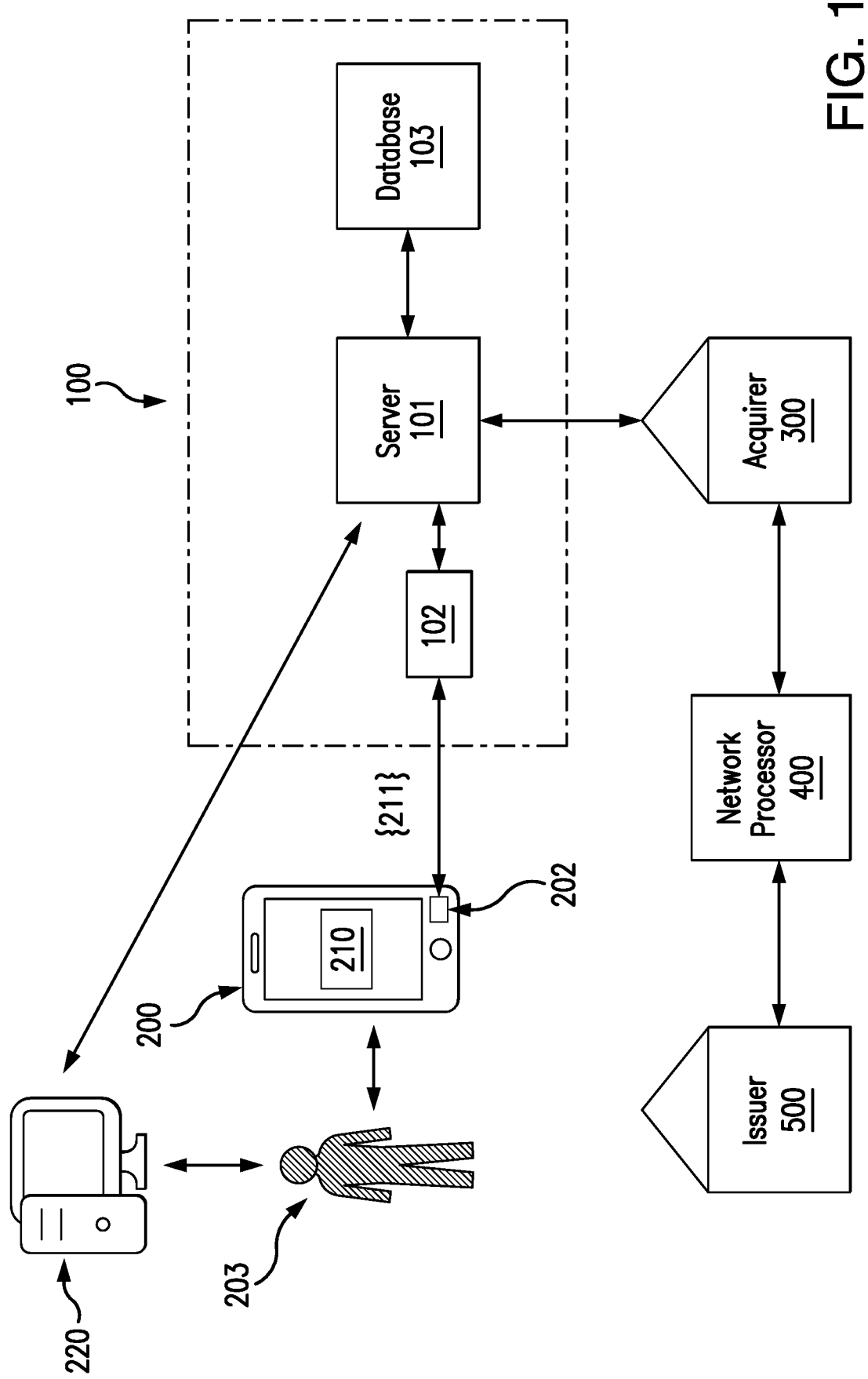
FIG. 1 illustrates an example system in which the methods described herein can be used.

FIG. 1 illustrates part of a system suitable for use in the present method and demonstrates how elements of the system interact to securely generate, store and transmit data.

In particular, the below disclosure illustrates how the method can be used to allow a set of tokenized credentials to be used in a transit network configured to operate in accordance with a message exchange protocol in which an authorization response is provided to a service provider.

The system comprises a service provider 100 that is configured to interact with a user 203 such that at least part of the interaction is automated. For example, this may be through the user 203 tapping an entry device, such as a tokenized mobile payment device 200, onto a dedicated reader, for example, on an entry gate, e.g., in order to gain access to a transit network. In this example, the service provider 100 is a transit provider, such as a rail and/or bus network operator. However, the method described below is applicable to a number of different systems. For example, the service provider could be a gymnasium, sports or entertainment venue or hotel room that requires identification upon entry, or a vending machine that accepts digital payments.

The service provider 100 comprises several elements that may be at the same location, or disposed in separate locations, including a server 101, a communication node 102 and a database 103, which can interact with each other as and when required. Processes described below that are performed by the service provider 100 should be understood as being controlled by the service provider server 101.

A user 203 interacts with the service provider 100 using a device 200 configured for interaction with the service provider 100. The device 200 stores a digital identifier 211 in a storage element 210. The storage element 210 could, for example, be a local storage element of the device 200, such as a secure element, a trusted execution environment or an area of device memory used by host card emulation software, or could be a remote storage element which the device 200 can communicate securely with, for example, as a means of cloud storage.

The device 200 is capable of transmitting the digital identifier 211 to the service provider 100. In the present example, the digital identifier 211 can be used to make payments from an account to which the user 203 has access to the service provider 100. For example, the device 200 may be a payment card comprising a radio frequency identification (RFID) tag or a mobile electronic device comprising a near field communication (NFC) element.

The digital identifier 211 allows the user to identify themselves to the service provider. The digital identifier 211 may, for example, be a payment token that can be used by the service provider 100 to initiate a payment from the user 203 to the service provider 100, e.g., such that the user can be granted access to a transit network. In such an example, the payment token is linked to payment credentials that are known to the user 203, such as an account number and sort code. In this example, the user 203 has opted to tokenize their account details, which has resulted in a payment token being provisioned onto their device 200. Such payment tokens can be provided to electronic point of sale terminals in a similar way to the credentials stored on the chip of a plastic NFC card. Each payment token contains a set of card-like credentials that are unknown to the user 203 (i.e., the user 203 knows their account details, but not the token details).

The service provider 100 comprises a previous interaction database 103 that stores records of interactions between the user 203 and the service provider 100. The previous interaction database 103 may be disposed in a single location or distributed across multiple locations. In the transit example, such previous interactions databases 103 may be used, for example, for the purposes of fare calculation in order that the user 203 may be charged the correct fare(s) for their journey(s) by billing the credentials 221 used to access the service provider 100.

The user 203 provides the digital identifier 211 to the service provider 100 when accessing services provided by the service provider 100. In the present example, when a user 203 attempts to access the transit network, the user 203 presents the digital identifier 211 to the service provider 100 by transmitting the digital identifier 211 from a communication node 202 of the device 200 to a communication node 102 of the service provider 100. For example, the communication node 202 of the device 200 may be an RFID tag or an NFC element and the communication node 102 of the service provider 100 may respectively be an RFID reader or an NFC reader. For example, the digital identifier 211 may be passed as part of a contactless EMV transaction.

If the service provider 100 accepts the digital identifier 211, the user 203 is allowed access to the transit network. For example, access to a train boarding area may be provided by opening a physical barrier. The communication node 102 of the service provider 100 could, for example, be located on such a barrier or gate. The service provider 100 may require that certain conditions are met before the user is provided access to the service: for example, the service provider 100 may check that the digital identifier 211 does not belong to a user that is banned from entering the system, or the service provider 100 may check that the digital identifier 211 can be validly used to initiate a payment to the service provider 100.

Figure 2:
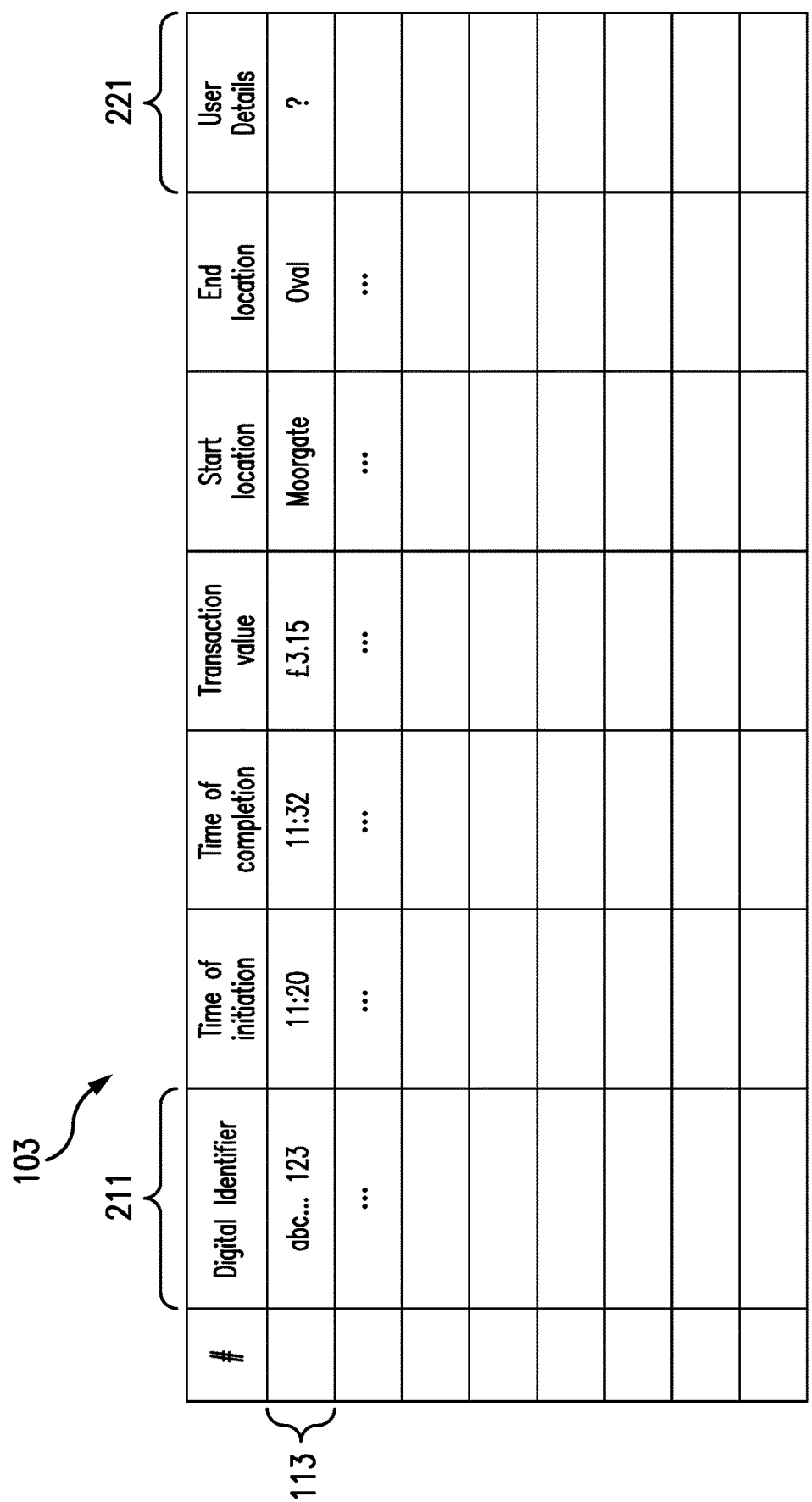
FIG. 2 illustrates an example of a previous interaction database.

After providing the user 203 with access to the transit service, the service provider 100 creates a data entry 113 in a previous interaction database 103, for example, as illustrated in FIG. 2. In some examples, the data entry 113 may be generated immediately upon providing access to the user 203. In other examples, the data entry may be generated when the user 203 has finished using the service, or later, e.g., as part of a consolidated data batch for a predefined period of time, such as a day or a week. FIG. 2 shows an example of a previous interaction database 103 comprising a plurality of data entries 113, each corresponding to a previous interaction between a user and a transit network. Each data entry record 113 comprises a digital identifier 211 and other information regarding the interaction. For example, the data entry 113 may comprise data indicating the time of initiation of the service (for example, the time the user 203 enters a train boarding area at an originating station), the time of completion of the service (for example, the time the user 203 exits a train boarding area at a destination station), a corresponding transaction amount, a start location and an end location.

Figure 3:
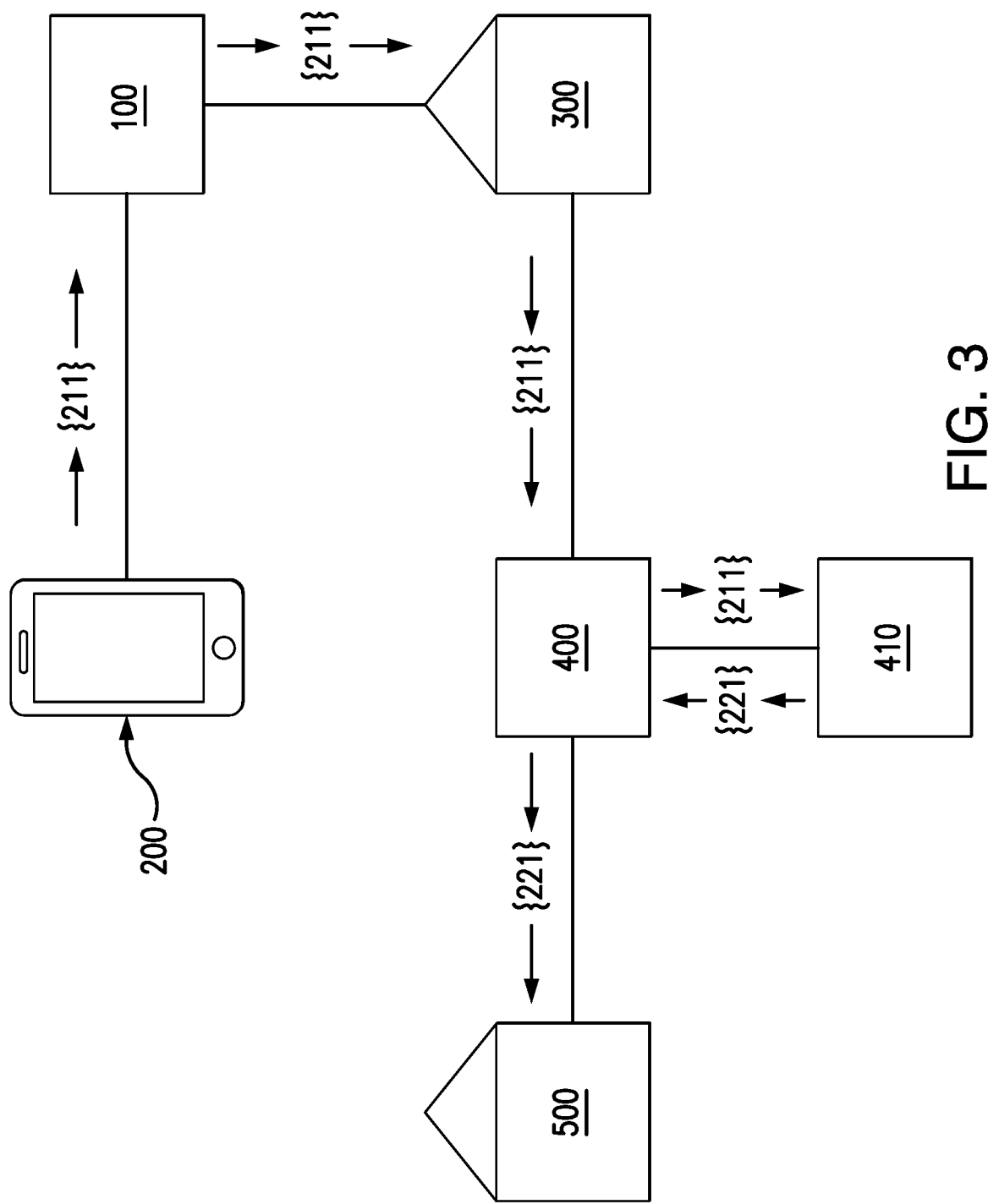
FIG. 3 illustrates an example method of payment.

The service provider 100 uses the digital identifier 211 to initiate a payment from the user 203 to the service provider 100, as illustrated by FIG. 3. To initiate the payment, the service provider 100 provides the digital identifier 211 and an indication of a payment amount to an acquiring financial institution (acquirer) 300 associated with the service provider 100. The acquiring financial institution 300 sends a payment request message to a network processor 400 for forwarding to an issuing financial institution (issuer) 500 associated with the user 203. The network processor 400 may form part of a payment processing network and may incorporate parts of several interlinked payment processing networks.

The payment may be initiated upon access to the service provider 100 being granted to the user 203, or the payment may be initiated after the user 203 has finished using the transit service.

Alternatively, an authorization to commence a period of aggregation may occur soon after the user's entry to the transit network. In this example, the user 203 enters the transit network, providing their digital identifier 211 which is not on a list deemed unacceptable. The digital identifier 211, along with the date, time and location of entry is sent to the service provider server 101. The service provider server 101 determines whether the digital identifier 211 has recently had a good authorization. If not, a new authorization request is initiated by sending a message to the acquirer 300, then on to the network processor 400, and finally to the issuer 500. If the issuer 500 approves the authorization request, then the service provider 100 starts to collect entry/exit taps representing journeys up to a value agreed with either the issuer 500, network processor 400, or acquirer 300, in order to manage liability. Once that value limit is reached, the service provider 100 takes the necessary steps to clear and settle for the journeys consumed by the user 203.

If the authorization request is declined by the issuer 500, then the digital identifier 211 is added to a list to prevent further consumption of travel against that identifier 211. The user 203 and/or the service provider 100 takes steps to recover any monies owed before removing the identifier 211 from the aforementioned list.

Whatever the timing and specific process used for authorization of a payment, at some point the digital identifier 211 must be translated into corresponding payment credentials 221 of a payment account. This can, for example, be done by the network processor 400 or the issuer 500.

In an example where the network processor 400 converts the digital identifier 211 to payment credentials 221, the network processor 400 may, for example, have access to a token database 410 comprising data indicating which payment credentials 221 are associated with given payment tokens. Alternatively, the network processor 400 may operate on the payment token according to a pre-determined algorithm in order to obtain the payment credentials 221.

In this example, the network processor 400 sends a payment request message to the issuing institution 500 associated with the user 203, where the payment request message comprises the payment credentials 221 associated with the user 203. The issuer 500 processes the request and sends the response back to the network processor 400. The network processor 400 then returns the issuer response to the acquirer 300, which in turn relays it to the service provider 100. The response to the transit operator 100 typically comprises information about whether the transaction was approved or declined.

The payment process may, for example, be an ISO 8583 0100 authorization request, a 20022 authorization request, a Faster Payment message or another kind of payment transaction.

After an interaction as described above, the relevant parties have access to the following information.

The user is aware of their payment credentials 221 (because the user had access to the payment credentials to begin with) but has not been provided with the digital identifier 211.

The service provider 100 has access to the digital identifier 211 (which was provided by the device 200 when the user 203 accessed the transit network) and to information relating to the interaction between the user 203 and the transit network. This information is stored in the previous interaction database 103. The service provider 100 has not been provided with the user's payment credentials 221.

The network processor 400 and/or issuer 500 have access to the user's digital identifier 211 and linked payment credentials 221 (as, for example, retrieved from a tokenization database 410 or obtained using a pre-determined algorithm), but do not have access to details of the user's interactions with the service provider 100.

Figure 4:
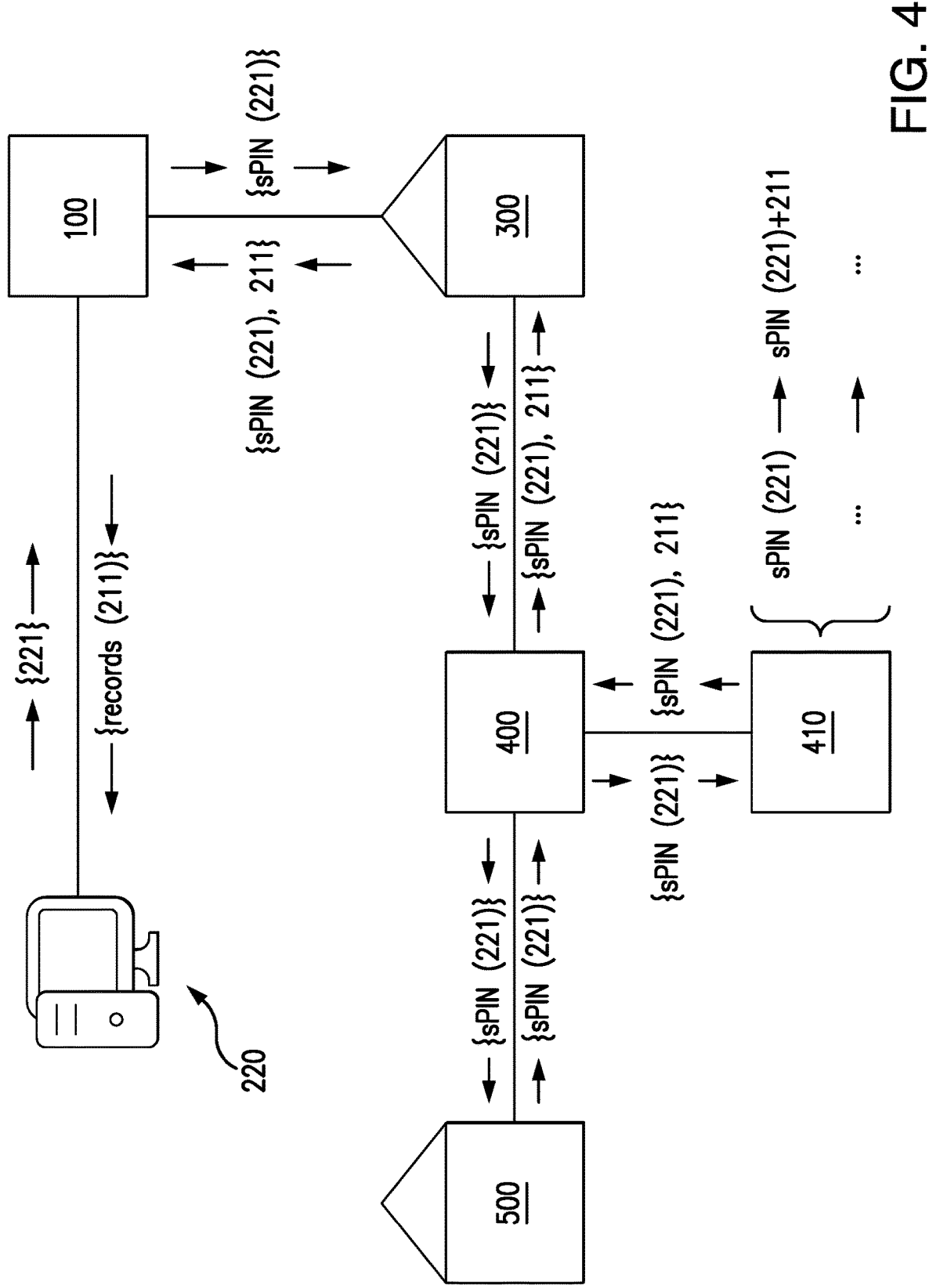
FIG. 4 illustrates an example method of exchanging identification data that allows a user to identify themselves to a service provider in order to access data relating to previous interactions between the user and the service provider.

The service provider 100 provides a service, e.g., an internet or telephone based service, that allows users 203 to access details of previous interactions. Users 203 may access this service through a communication device 220, as shown in FIG. 4. The communication device 220 may, for example, be a desktop computer, laptop computer, a mobile electronic device, such as a tablet or smartphone, a telephone, a terminal operated by the service provider 100 (e.g., a self-service ticket machine). The communication device 220 may, in some examples, be the same device as the device 200 used to provide the digital identifier 211 to the service provider 100. The communication device may, for example, provide access to the service through a web browser or an application.

In order to access details of previous interactions, the user 203 must identify themselves to the service provider 100. This allows the service provider 100 to obtain previous interaction data associated with the correct user and to ensure that private data is not being shared with unauthorised parties.

In the present scenario, where the service provider 100 is not provided with payment credentials known to the user 203 in response to a payment request (but is only provided with a digital identifier 211), it is not possible for the user 203 to identify themselves to the service provider 100 to obtain the desired information.

The following steps, illustrated by FIG. 4, provide a method of exchanging identification data that allows a user to identify themselves to a service provider 100 in order to access data relating to previous interactions between the user 203 and the service provider 100.

The user 203 uses a communication device 220 to provide user details to the service provider 100, e.g., via a user interface. The user details may be, for example, an account number and sort code or an IBAN that may be manually typed into text boxes provided in a web browser or mobile application. Data corresponding to user details and a request for a list of previous services provided to the user 203 by the service provider 100 are sent from the communication device 220 to the service provider 100.

The service provider 100 then generates a special personal identifier number, 'sPIN', based on the user details. The sPIN comprises the data corresponding to the user details and a flag indicating to the network processor that the sPIN contains the user details. The sPIN may, for example, have the same number format as payment credentials for use in a four party card authorization process.

A request comprising the sPIN is then sent from the service provider 100 to the network processor 400, via the acquirer 300. The request may, for example, appear to the network processor 400 as an account status enquiry request. The request may, for example, be an ISO 8535 0100 request message.

The network processor 400 and the issuing institution 500 process the request and perform any necessary checks, including security checks. The network processor 400 determines from the flag that the sPIN contains the user details. The network processor 400 extracts the user details from the sPIN and uses the user details to obtain one or more digital identifiers 211 linked to the user details. (More than one digital identifier may be linked to a single set of user details if those user details have been digitized multiple times. For example, a single bank account could be digitized onto both a smartphone and a smartwatch, or into multiple digital wallets on the same device.) This is the reverse of the process described above during a payment request in which the network processor 400 uses the digital identifier 211 to obtain user details. Alternatively, the network processor 400 can route the request to the issuer 500, which then recognizes the flag and takes on the responsibility for the conversion.

The network processor 400 sends a response to the service provider 100 (via the acquirer 300), the response comprising the sPIN and data corresponding to the one or more digital identifiers 211. As a result of the response, the service provider 100 now has access to both the digital identifier(s) 211 (that is generally unknown by the user 203) and the user details that are known by the user 203. The service provider 100 may then edit the entries in the previous interaction database 103 to include the user details in all data entries that are associated with the digital identifier(s) 211.

The service provider 100 then obtains a list of previous interactions between the user 203 and the service provider 100. In order to obtain the list of previous interactions, the service provider 100 searches the previous interaction database 103 for data entries comprising the digital identifier(s) 211.

Finally, the service provider 100 provides to the user 203 a message comprising the list of previous interactions associated with the digital identifier(s) 211. The message may be provided to a communication device 220 of the user 203, and may, for example, be displayed to the user 203 using a display screen of the communication device 220.

The above method allows the user 203 to identify themselves to the service provider (e.g., transit provider) while using pre-existing data exchange processes of a four party card payment authorization system.

Figure 5:
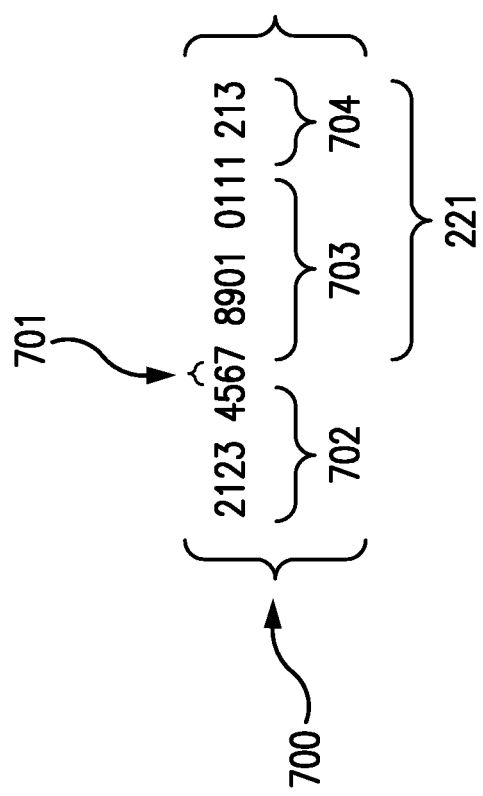
FIG. 5 illustrates an example sPIN.

FIG. 5 shows an example of an sPIN 700 that may be processed within existing payment processing systems. The sPIN comprises nineteen digits (which is typically the maximum length allowed for the PAN field in ISO 8583 messages) which may be treated by an issuing 500 or acquiring 300 institution as though it were a normal credit card or debit card payment number. In the example of FIG. 5, the first six digits 702 of the sPIN 700 correspond to the bank identification number (BIN) that allows the network processor 400 to identify the issuing institution 500 to which the request message comprising the sPIN 700 should be forwarded. The seventh digit 701 is a flag which indicates to the network processor 400 that the sPIN 700 comprises user details. The eighth to fifteenth digits 703 indicate the account number of the user 203 and the sixteenth to nineteenth digits 704 indicate the last four digits of the sort code of the corresponding account. Since existing payment processing conventions require that a one-to-one mapping exists between the BIN of a user's issuing institution and the first two digits of a user's sort code, the network processor 400 is able to determine the initial two digits of the sort code using the BIN by referring to a lookup table. The eighth to the nineteenth digits together correspond to the user details when combined with the first two digits of the sort code as determined from the BIN.

Figure 6:
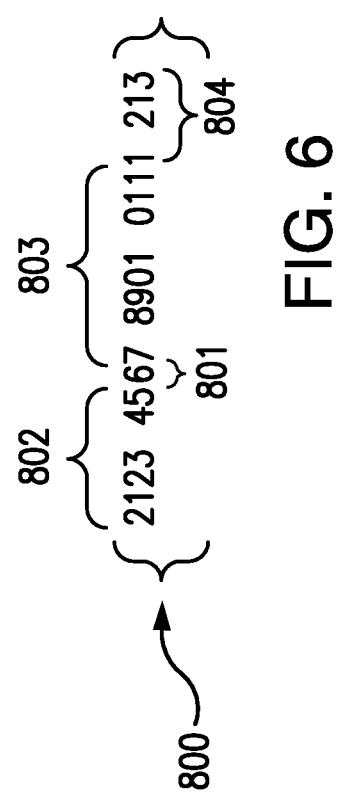
FIG. 6 illustrates a further example sPIN.

FIG. 6 shows an alternative example on a nineteen digit sPIN 800. Similarly to the example of FIG. 5, the first six digits 802 are the BIN, the eighth to fifteenth digits 803 are the account number and the sixteenth to nineteenth digits 804 are the last four digits of the sort code. However, in this case the BIN in a dedicated flag BIN, which the network processor 400 or the issuer 500 can identify in a look-up table. In this example, the seventh digit 801 indicates the first two digits of the sort code.

Figure 7:
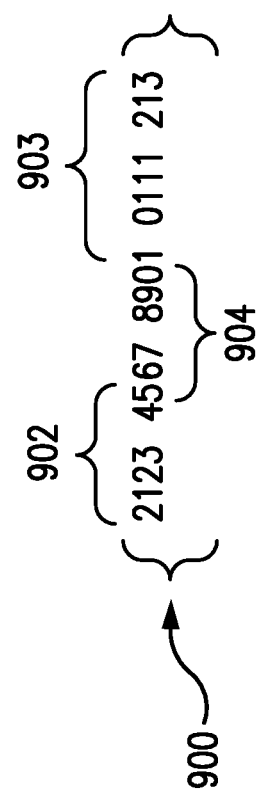
FIG. 7 illustrates yet another example sPIN.

FIG. 7 shows a further alternative example of an sPIN 900. Similarly to the example of FIG. 6, the BIN in this case is a dedicated flag BIN. In this example, the BIN 902 and sort codes 904 are chosen in advance such that the last digit of the BIN 902 is the same as the first digit of the sort code 904. Thus, the six digit BIN 902, the six digit sort code 904, and the eight digit account number 903 can be included in a nineteen digit sPIN 900 by using a single digit to represent both the final digit of the BIN and the first digit of the sort code.

For sPINs to be processed, it may be necessary to turn off certain security and/or data integrity checks (such as, Luhn check digit validation) usually implemented by a network processor 400.

Figure 8:
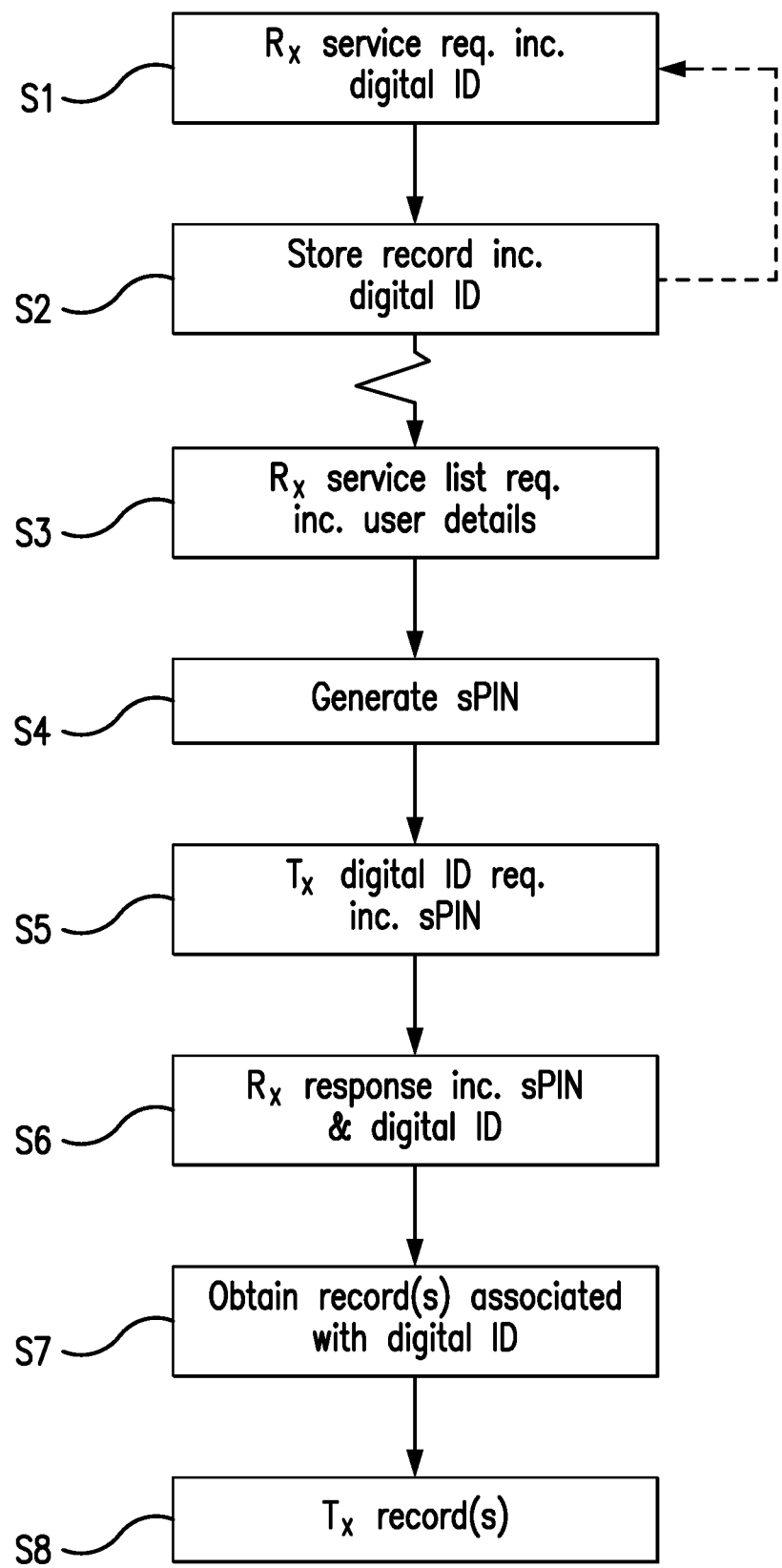
FIG. 8 is a flowchart of an example method.

FIG. 8 is a flowchart illustrating the steps of an example method performed by a server of a service provider, such as transit provider server 101.

At step S1 the service provider receives, from a user device, a request for a service, the request indicating a digital identifier. At step S2 the service provider securely stores, in an interactions database, a record of the requested service together with the digital identifier. These steps may optionally be repeated one or more times if multiple services are requested using the same digital identifier.

At a later time, at step S3 the service provider server receives from a communications device a request for a list of services provided to the user by the service provider, said request indicating user details which are available to the user but which were not indicated in any of the one or more requests for services.

The service provider server then generates a special personal identifier number (sPIN) at step S4, the sPIN indicating the user details and comprising a flag indicating to a network processor that the sPIN indicates the user details. At step S5 the service provider server sends a request for the digital identifier to the network processor, the request comprising the sPIN.

At step S6, the service provider server receives, from the network processor, a response to the request for the digital identifier, said response comprising the sPIN and the digital identifier. In response to this, at step S7 the service provider server obtains, from the interactions database, the record of each requested service associated with the digital identifier. Finally, at step S8 the service provider server provides, to the communications device, the record of each requested service associated with the digital identifier.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, CDs (compact discs), DVDs (digital versatile discs), or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

Receivers and transmitters as described herein may be standalone or may be comprised in transceivers. User input devices can include, without limitation, microphones, buttons, keypads, touchscreens, touchpads, trackballs, joysticks and mice. User output devices can include, without limitation, speakers, graphical user interfaces, indicator lights and refreshable braille displays. User interface devices can comprise one or more user input devices, one or more user output devices, or both.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, and as described, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer implemented method of providing access to securely stored data, the method comprising:
   receiving, at a server of a service provider, from a user device, one or more requests for services, each such request indicating a same digital identifier;
   securely storing, by the server, in an interactions database, a record of each requested service together with the digital identifier; and
   at a later time:
      receiving, at the server, from a communications device, a request for a list of services provided to the user by the service provider, said request indicating user details which are available to the user but which were not indicated in any of the one or more requests for services, the user details including an account number of an account associated with the digital identifier, the account number different than the digital identifier;
      generating, by the server, a special personal identifier number (sPIN), the sPIN indicating the user details and comprising a flag indicating that the sPIN indicates the user details, the sPIN different than the account number and the digital identifier;
      sending, by the server, a request for the digital identifier to a network processor, the request comprising the sPIN;
      receiving, at the server, from the network processor, a response to the request for the digital identifier, said response comprising the sPIN and the digital identifier;
      responsive thereto, obtaining, by the server, from the interactions database, the record of each requested service associated with the digital identifier; and
      providing, by the server, to the communications device, the record of each requested service associated with the digital identifier.

2. The method of claim 1, wherein the communications device is the user device.

3. The method of claim 1, wherein the digital identifier is stored on the user device.

4. The method of claim 1, wherein the digital identifier is a payment token.

5. The method of claim 1, wherein the sPIN is in a format corresponding to that of a primary account number (PAN).

6. The method of claim 1, wherein the sPIN consists of nineteen digits.

7. The method of claim 1, wherein the user details further include a sort code of the account associated with the digital identifier.

8. The method of claim 1, wherein the flag is a single digit.

9. The method of claim 8, wherein:
   the sPIN is in a format corresponding to that of a primary account number (PAN) for the account associated with the digital identifier;
   the user details indicate one or both of the primary account number and a sort code of the account;
   a first six digits of the sPIN identify an issuer of the account, and indicate a first two digits of the sort code;
   one of the remaining digits of the sPIN is the flag;
   eight of the remaining digits of the sPIN indicate the primary account number; and
   four of the remaining digits of the sPIN indicate a last four digits of the sort code.

10. The method of claim 1, wherein the flag is a flag code corresponding to a code stored by the network processor and/or an issuer of the account associated with the digital identifier.

11. The method of claim 10, wherein:
the sPIN is in a format corresponding to that of a primary account number (PAN) for the account associated with the digital identifier;
the user details indicate a sort code of the account;
a first six digits of the sPIN are the flag code, and identify an issuer of the account;
one of the remaining digits of the sPIN indicates a first two digits of the sort code;
eight of the remaining digits of the sPIN indicate the primary account number; and
four of the remaining digits of the sPIN include a last four digits of the sort code.

12. The method of claim 10, wherein:
the sPIN is in a format corresponding to that of a primary account number (PAN) for the account associated with the digital identifier;
the user details indicate a sort code of the account;
a first six digits of the sPIN are the flag code, and identify an issuer of the account;
a final digit of the flag code indicates a digit of the sort code;
five of the remaining digits of the sPIN indicate a remainder of the sort code; and
eight of the remaining digits of the sPIN include the primary account number.

13. The method of claim 1, further comprising, prior to receiving the request for the list of services provided to the user by the service provider:
receiving, from a further user device, one or more further requests for services, each such request indicating a further digital identifier different to the digital identifier received from the user device; and
securely storing, in the interactions database, a record of each further requested service together with the further digital identifier;
wherein the response to the request for the digital identifier further comprises the further digital identifier; the method further comprising:
responsive to receiving the response, obtaining, from the interactions database, the record of each further requested service associated with the further digital identifier; and
providing, to the communications device, the record of each further requested service associated with the further digital identifier.

14. A server, associated with a service provider, for use in providing access to securely stored data, the server comprising at least one computing device configured to:
receive, from a user device, one or more requests for services, each such request indicating a same digital identifier;
securely store, in an interactions database, a record of each requested service together with the digital identifier;
at a later time:
receive, from a communications device, a request for a list of services provided to the user by the service provider, said request indicating user details which are available to the user but which were not indicated in any of the one or more requests for services, the user details including an account number of an account associated with the digital identifier, the account number different than the digital identifier;
generate a special personal identifier number (sPIN), the sPIN indicating the user details and comprising a flag indicating that the sPIN indicates the user details, the sPIN different than the account number and the digital identifier;
send a request for the digital identifier to a network processor, the request comprising the sPIN;
receive, from the network processor, a response to the request for the digital identifier, said response comprising the sPIN and the digital identifier;
responsive thereto, obtain, from the interactions database, the record of each requested service associated with the digital identifier; and
provide, to the communications device, the record of each requested service associated with the digital identifier.

15. A non-transitory computer-readable storage medium comprising instructions for providing access to securely stored data, which, when executed by a processor, cause the processor to:
receive, from a user device, one or more requests for services, each such request indicating a same digital identifier;
securely store, in an interactions database, a record of each requested service together with the digital identifier;
at a later time:
receive, from a communications device, a request for a list of services provided to the user by the service provider, said request indicating user details which are available to the user but which were not indicated in any of the one or more requests for services, the user details including an account number of an account associated with the digital identifier, the account number different than the digital identifier;
generate a special personal identifier number (sPIN), the sPIN indicating the user details and comprising a flag indicating that the sPIN indicates the user details, the sPIN different than the account number and the digital identifier;
send a request for the digital identifier to a network processor, the request comprising the sPIN;
receive, from the network processor, a response to the request for the digital identifier, said response comprising the sPIN and the digital identifier;
responsive thereto, obtain, from the interactions database, the record of each requested service associated with the digital identifier; and
provide, to the communications device, the record of each requested service associated with the digital identifier.

* * * * *